US010897340B2

(12) United States Patent  
Li et al.

(10) Patent No.: US 10,897,340 B2  
(45) Date of Patent: Jan. 19, 2021

(54) NON-ORTHOGONAL MULTIPLE ACCESS (NOMA)-BASED CHANNEL QUALITY INDICATOR (CQI) REPORTING

(71) Applicant: QUALCOMM Incorporated, San Diego, CA (US)

(72) Inventors: Chong Li, Weehawken, NJ (US); Junyi Li, Chester, NJ (US); Piyush Gupta, Bridgewater, NJ (US); Hua Wang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 16/380,562

(22) Filed: Apr. 10, 2019

(65) Prior Publication Data

US 2019/0334686 A1    Oct. 31, 2019

Related U.S. Application Data

(60) Provisional application No. 62/662,634, filed on Apr. 25, 2018.

(51) Int. Cl.
  *H04L 5/00*      (2006.01)
  *H04L 1/00*      (2006.01)
  *H04B 17/336*    (2015.01)
  *H04W 76/27*     (2018.01)

(52) U.S. Cl.
  CPC ......... *H04L 5/0057* (2013.01); *H04B 17/336* (2015.01); *H04L 1/0003* (2013.01); *H04L 1/0009* (2013.01); *H04W 76/27* (2018.02)

(58) Field of Classification Search
  CPC ... H04L 5/0057; H04L 1/0003; H04L 1/0009; H04B 17/336
  See application file for complete search history.

(56) References Cited

U.S. PATENT DOCUMENTS

| 8,018,855 B2 | 9/2011 | Englund et al. |
| 2008/0268785 A1 | 10/2008 | McCoy et al. |
| 2016/0173261 A1 | 6/2016 | Di Girolamo et al. |
| 2018/0167920 A1* | 6/2018 | Kim .................. H04W 72/042 |

OTHER PUBLICATIONS

Higuchi K., et al., "Non-orthogonal Multiple Access (NOMA) with Successive Interference Cancellation for Future Radio Access," IEICE Transactions on Communications, vol. E98.B, No. 3, Mar. 1, 2015, pp. 403-414, XP055287194, ISSN: 0916-8516, DOI: 10.1587/transcom.E98.13.403, Section 2.2; p. 405-p. 406 p. 408-p. 409, figures 3-4.
International Search Report and Written Opinion—PCT/US2019/026980—ISA/EPO—dated Aug. 21, 2019.

* cited by examiner

*Primary Examiner* — Kent Krueger
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of one or more resources, assigned to multiple UEs, to be used to transmit a channel quality indicator (CQI) report; receive an indication of a threshold value associated with a range of channel conditions corresponding to a modulation and coding scheme (MCS) being used to communicate with the UE; and selectively transmit the CQI report on the one or more resources based at least in part on whether a measured channel condition is outside of the range of channel conditions by at least the threshold value. Numerous other aspects are provided.

30 Claims, 6 Drawing Sheets

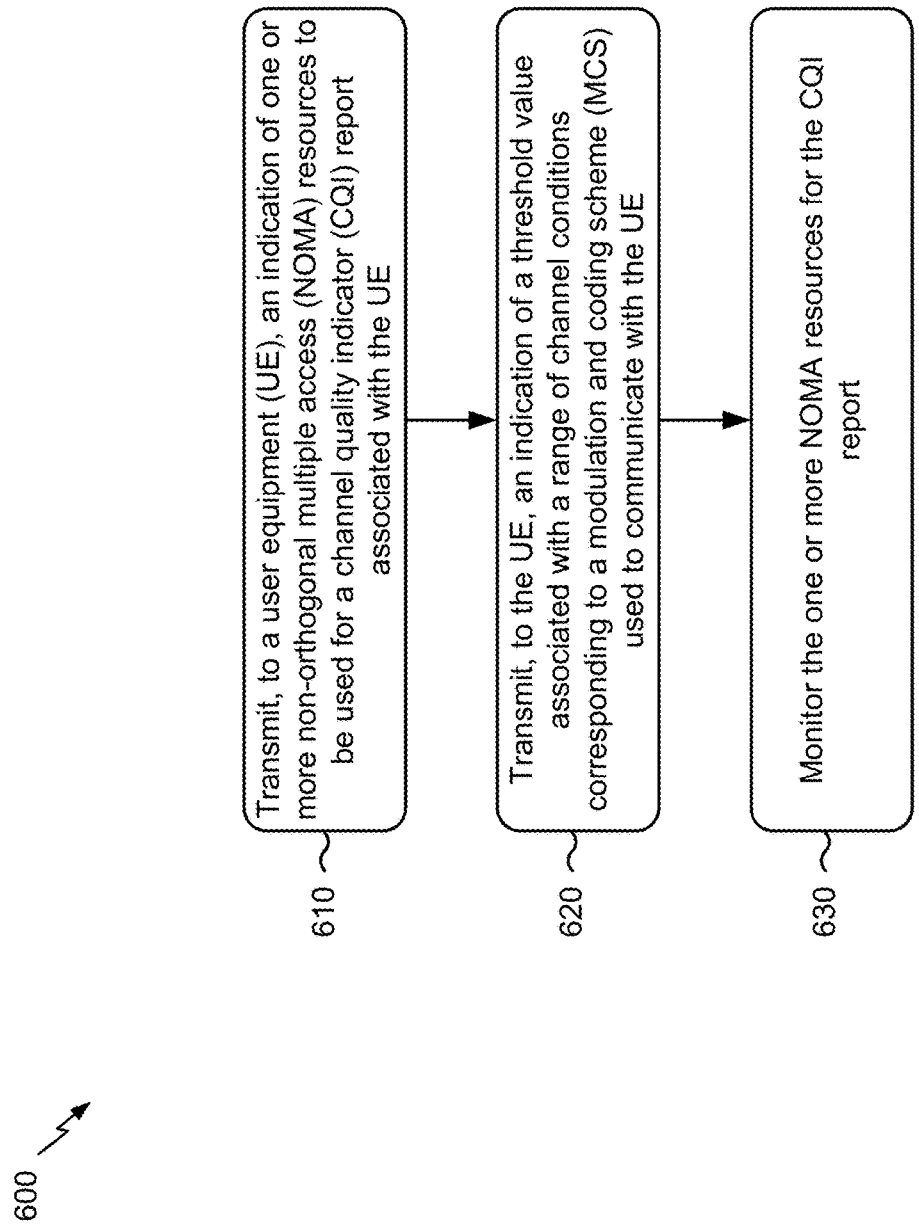

NON-ORTHOGONAL MULTIPLE ACCESS (NOMA)-BASED CHANNEL QUALITY INDICATOR (CQI) REPORTING

CROSS-REFERENCE TO RELATED APPLICATIONS UNDER 35 U.S.C. § 119

This application claims priority to U.S. Provisional Patent Application No. 62/662,634, filed on Apr. 25, 2018, entitled "TECHNIQUES AND APPARATUSES FOR NON-ORTHOGONAL MULTIPLE ACCESS (NOMA)-BASED CHANNEL QUALITY INDICATOR (CQI) REPORTING," which is hereby expressly incorporated by reference herein.

FIELD OF THE DISCLOSURE

Aspects of the present disclosure generally relate to wireless communication, and more particularly to techniques and apparatuses for non-orthogonal multiple access (NOMA)-based channel quality indicator (CQI) reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indication of one or more non-orthogonal multiple access (NOMA) resources to be used to transmit a channel quality indicator (CQI) report; receiving an indication of a threshold value associated with a range of channel conditions corresponding to a modulation and coding scheme (MCS) being used to communicate with the UE; and selectively transmitting the CQI report on the one or more NOMA resources based at least in part on whether a measured channel condition is outside of the range of channel conditions by at least the threshold value.

In some aspects, a user equipment for wireless communication may include memory and one or more processors coupled to the memory. The memory and the one or more processors may be configured to receive an indication of one or more non-orthogonal multiple access (NOMA) resources to be used to transmit a channel quality indicator (CQI) report; receive an indication of a threshold value associated with a range of channel conditions corresponding to a modulation and coding scheme (MCS) being used to communicate with the UE; and selectively transmit the CQI report on the one or more NOMA resources based at least in part on whether a measured channel condition is outside of the range of channel conditions by at least the threshold value.

In some aspects, a non-transitory computer-readable medium may store one or more instructions for wireless communication. The one or more instructions, when executed by one or more processors of a user equipment, may cause the one or more processors to receive an indication of one or more non-orthogonal multiple access (NOMA) resources to be used to transmit a channel quality indicator (CQI) report; receive an indication of a threshold value associated with a range of channel conditions corresponding to a modulation and coding scheme (MCS) being used to communicate with the UE; and selectively transmit the CQI report on the one or more NOMA resources based at least in part on whether a measured channel condition is outside of the range of channel conditions by at least the threshold value.

In some aspects, an apparatus for wireless communication may include means for receiving an indication of one or more non-orthogonal multiple access (NOMA) resources to be used to transmit a channel quality indicator (CQI) report; means for receiving an indication of a threshold value associated with a range of channel conditions corresponding to a modulation and coding scheme (MCS) being used to communicate with the apparatus; and means for selectively transmitting the CQI report on the one or more NOMA resources based at least in part on whether a measured channel condition is outside of the range of channel conditions by at least the threshold value.

In some aspects, a method of wireless communication, performed by a base station, may include transmitting, to a user equipment (UE), an indication of one or more non-orthogonal multiple access (NOMA) resources to be used for a channel quality indicator (CQI) report associated with the UE; transmitting, to the UE, an indication of a threshold value associated with a range of channel conditions corresponding to a modulation and coding scheme (MCS) used to communicate with the UE; and monitoring the one or more NOMA resources for the CQI report.

In some aspects, a base station for wireless communication may include memory and one or more processors coupled to the memory. The memory and the one or more processors may be configured to transmit, to a user equipment (UE), an indication of one or more non-orthogonal multiple access (NOMA) resources to be used for a channel quality indicator (CQI) report associated with the UE; transmit, to the UE, an indication of a threshold value associated with a range of channel conditions corresponding to a modulation and coding scheme (MCS) used to communicate with the UE; and monitor the one or more NOMA resources for the CQI report.

In some aspects, a non-transitory computer-readable medium may store one or more instructions for wireless communication. The one or more instructions, when executed by one or more processors of a base station, may cause the one or more processors to transmit, to a user equipment (UE), an indication of one or more non-orthogonal multiple access (NOMA) resources to be used for a channel quality indicator (CQI) report associated with the UE; transmit, to the UE, an indication of a threshold value associated with a range of channel conditions corresponding to a modulation and coding scheme (MCS) used to communicate with the UE; and monitor the one or more NOMA resources for the CQI report.

In some aspects, an apparatus for wireless communication may include means for transmitting, to a user equipment (UE), an indication of one or more non-orthogonal multiple access (NOMA) resources to be used for a channel quality indicator (CQI) report associated with the UE; means for transmitting, to the UE, an indication of a threshold value associated with a range of channel conditions corresponding to a modulation and coding scheme (MCS) used to communicate with the UE; and means for monitoring the one or more NOMA resources for the CQI report.

In some aspects, a method of wireless communication, performed by a UE, may include receiving an indication of one or more resources, assigned to multiple UEs, to be used to transmit a CQI report; receiving an indication of a threshold value associated with a range of channel conditions corresponding to an MCS being used to communicate with the UE; and selectively transmitting the CQI report on the one or more resources based at least in part on whether a measured channel condition is outside of the range of channel conditions by at least the threshold value.

In some aspects, a user equipment for wireless communication may include memory and one or more processors coupled to the memory. The memory and the one or more processors may be configured to receive an indication of one or more resources, assigned to multiple UEs, to be used to transmit a CQI report; receive an indication of a threshold value associated with a range of channel conditions corresponding to an MCS being used to communicate with the UE; and selectively transmit the CQI report on the one or more resources based at least in part on whether a measured channel condition is outside of the range of channel conditions by at least the threshold value.

In some aspects, a non-transitory computer-readable medium may store one or more instructions for wireless communication. The one or more instructions, when executed by one or more processors of a user equipment, may cause the one or more processors to receive an indication of one or more resources, assigned to multiple UEs, to be used to transmit a CQI report; receive an indication of a threshold value associated with a range of channel conditions corresponding to an MCS being used to communicate with the UE; and selectively transmit the CQI report on the one or more resources based at least in part on whether a measured channel condition is outside of the range of channel conditions by at least the threshold value.

In some aspects, an apparatus for wireless communication may include means for receiving an indication of one or more resources, assigned to multiple apparatuses, to be used to transmit a CQI report; means for receiving an indication of a threshold value associated with a range of channel conditions corresponding to an MCS being used to communicate with the apparatus; and means for selectively transmitting the CQI report on the one or more resources based at least in part on whether a measured channel condition is outside of the range of channel conditions by at least the threshold value.

In some aspects, a method of wireless communication, performed by a base station, may include transmitting, to a UE, an indication of one or more resources, assigned to multiple UEs, to be used for a CQI report associated with the UE; transmitting, to the UE, an indication of a threshold value associated with a range of channel conditions corresponding to an MCS used to communicate with the UE; and monitoring the one or more resources for the CQI report.

In some aspects, a base station for wireless communication may include memory and one or more processors coupled to the memory. The memory and the one or more processors may be configured to transmit, to a UE, an indication of one or more resources, assigned to multiple UEs, to be used for a CQI report associated with the UE; transmit, to the UE, an indication of a threshold value associated with a range of channel conditions corresponding to an MCS used to communicate with the UE; and monitor the one or more resources for the CQI report.

In some aspects, a non-transitory computer-readable medium may store one or more instructions for wireless communication. The one or more instructions, when executed by one or more processors of a base station, may cause the one or more processors to transmit, to a UE, an indication of one or more resources, assigned to multiple UEs, to be used for a CQI report associated with the UE; transmit, to the UE, an indication of a threshold value associated with a range of channel conditions corresponding to an MCS used to communicate with the UE; and monitor the one or more resources for the CQI report.

In some aspects, an apparatus for wireless communication may include means for transmitting, to a UE, an indication of one or more resources, assigned to multiple UEs, to be used for a CQI report associated with the UE; means for transmitting, to the UE, an indication of a threshold value associated with a range of channel conditions corresponding to an MCS used to communicate with the UE; and means for monitoring the one or more resources for the CQI report.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5 and 6 are diagrams illustrating example processes relating to NOMA-based CQI reporting, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
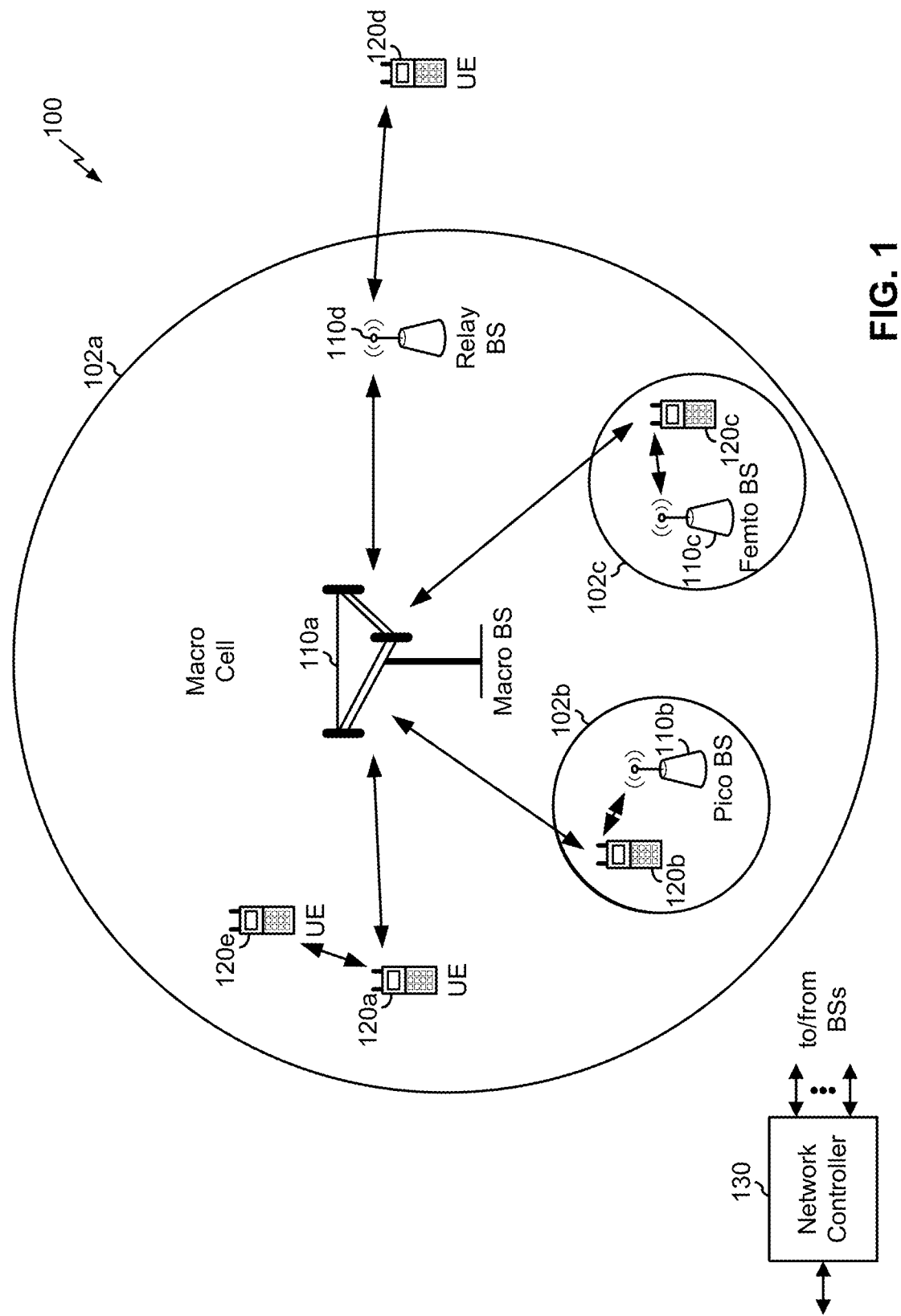
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
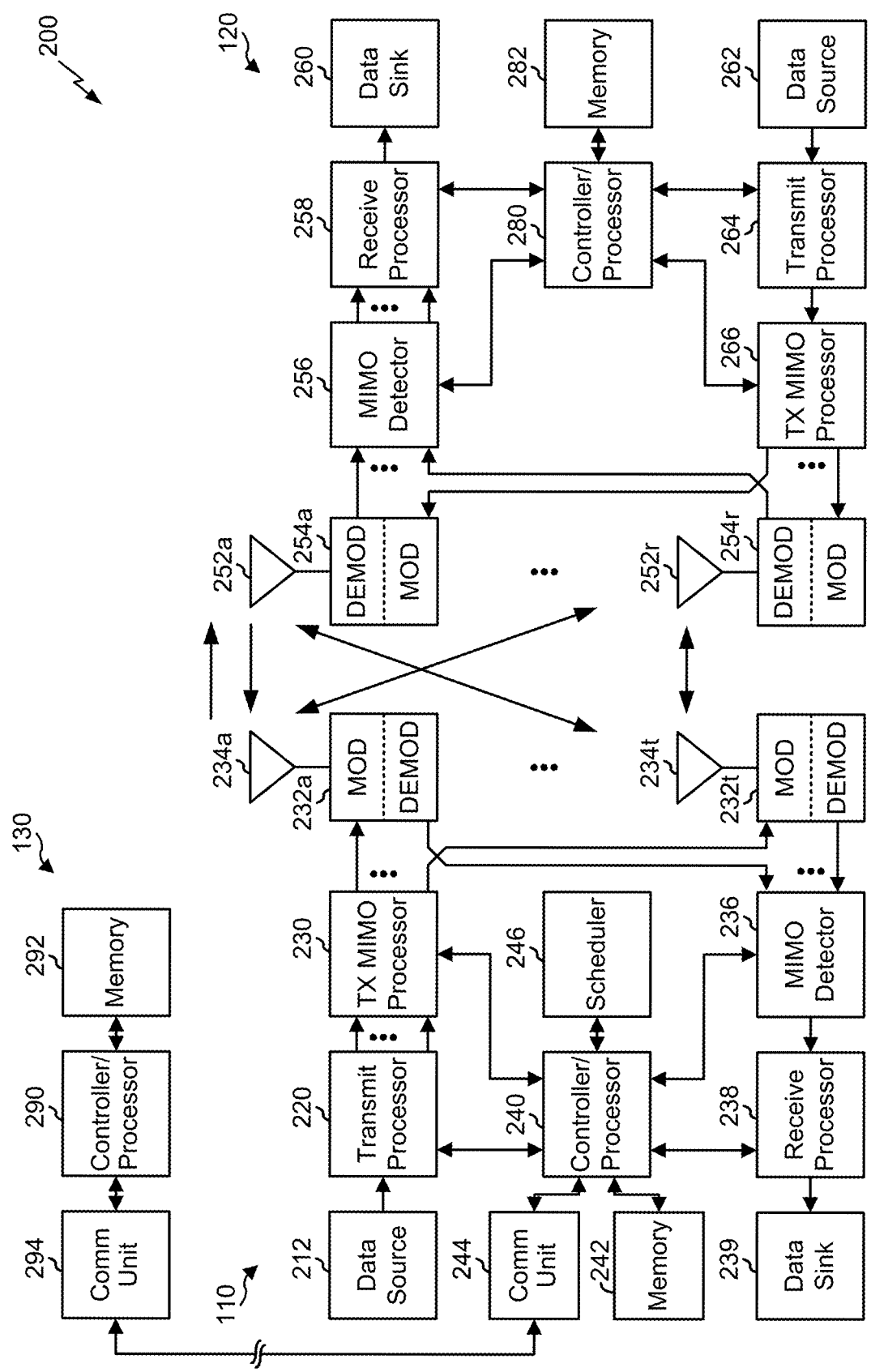
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with NOMA-based CQI reporting, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving an indication of one or more non-orthogonal multiple access (NOMA) resources to be used to transmit a channel quality indicator (CQI) report; means for receiving an indication of a threshold value associated with a range of channel conditions corresponding to a modulation and coding scheme (MCS) being used to communicate with the apparatus; means for selectively transmitting the CQI report on the one or more NOMA resources based at least in part on whether a measured channel condition is outside of the range of channel conditions by at least the threshold value; and/or the like. Additionally, or alternatively, UE 120 may include means for receiving an indication of one or more resources, assigned to multiple UEs 120, to be used to transmit a CQI report; means for receiving an indication of a threshold value associated with a range of channel conditions corresponding to an MCS being used to communicate with the UE 120; means for selectively transmitting the CQI report on the one or more resources based at least in part on whether a measured channel condition is outside of the range of channel conditions by at least the threshold value; and/or the like. In some aspects, such means may include one or more components of UE 120 described in connection with FIG. 2.

In some aspects, base station 110 may include means for transmitting, to a user equipment (UE), an indication of one or more non-orthogonal multiple access (NOMA) resources to be used for a channel quality indicator (CQI) report associated with the UE; means for transmitting, to the UE, an indication of a threshold value associated with a range of channel conditions corresponding to a modulation and coding scheme (MCS) used to communicate with the UE; means for monitoring the one or more NOMA resources for the CQI report; and/or the like. Additionally, or alternatively, base station 110 may include means for transmitting, to a UE 120, an indication of one or more resources, assigned to multiple UEs 120, to be used for a CQI report associated with the UE 120; means for transmitting, to the UE 120, an indication of a threshold value associated with a range of channel conditions corresponding to an MCS used to communicate with the UE 120; means for monitoring the one or more resources for the CQI report; and/or the like. In some aspects, such means may include one or more components of base station 110 described in connection with FIG. 2.

As indicated above, FIG. 2 is provided merely as an example. Other examples are possible and may differ from what was described with regard to FIG. 2.

In wireless communication systems, such as 4G/LTE, 5G/NR, and/or the like, a channel quality indicator (CQI) value may be reported by a UE 120 to a base station 110 to indicate the quality of a channel. The base station 110 may use a reported CQI value to perform link adaptation to modify one or more parameters used to communicate with the UE 120 via the channel. For example, the base station 110 may modify a modulation and coding scheme (MCS), used to communicate with the UE 120, based at least in part on a CQI value received from the UE 120. In this way, if the UE 120 reports that channel conditions are relatively bad, then the base station 110 may modulate and/or encode a downlink communication using an MCS corresponding to a lower MCS index value, a lower data rate, a lower coding rate, and/or the like, to improve the likelihood that the downlink communication is successfully received by the UE 120. Conversely, if the UE 120 reports that channel conditions are relatively good, then the base station 110 may modulate and/or encode a downlink communication using an MCS corresponding to a higher MCS index value, a higher data rate, a higher coding rate, and/or the like, to increase throughput and conserve network resources.

In some cases, the UE 120 may report CQI periodically (e.g., referred to as periodic CQI), such as according to a period indicated by the base station 110 (e.g., in a radio resource control (RRC) message and/or the like). Additionally, or alternatively, the UE 120 may report CQI aperiodically (e.g., referred to as aperiodic CQI), such as in a response to a request transmitted by the base station 110. In this way, link adaptation may be performed periodically using the periodic CQI, and/or may be performed using the aperiodic CQI if certain conditions are encountered that trigger such aperiodic CQI reporting.

In some scenarios, there may be a large number of UEs 120 in communication with a base station 110, such as thousands of UEs 120, tens of thousands of UEs 120, or more. Some examples of these scenarios include massive machine type communication (mMTC) scenarios, Internet of Things (IoT) scenarios, factory automation scenarios, and/or the like. In this case, the amount of overhead used for CQI reporting may be large, which may consume significant network resources. Such overhead may be reduced by configuring periodic CQI with a longer period, but this may increase latency and result in poor performance due to link adaptation being performed less frequently. Some techniques and apparatuses described herein reduce the amount of overhead used for CQI reporting while still permitting link adaptation to be performed when needed, thereby conserving network resources, reducing latency, improving performance, and/or the like. Additional details are described below.

Figure 3:
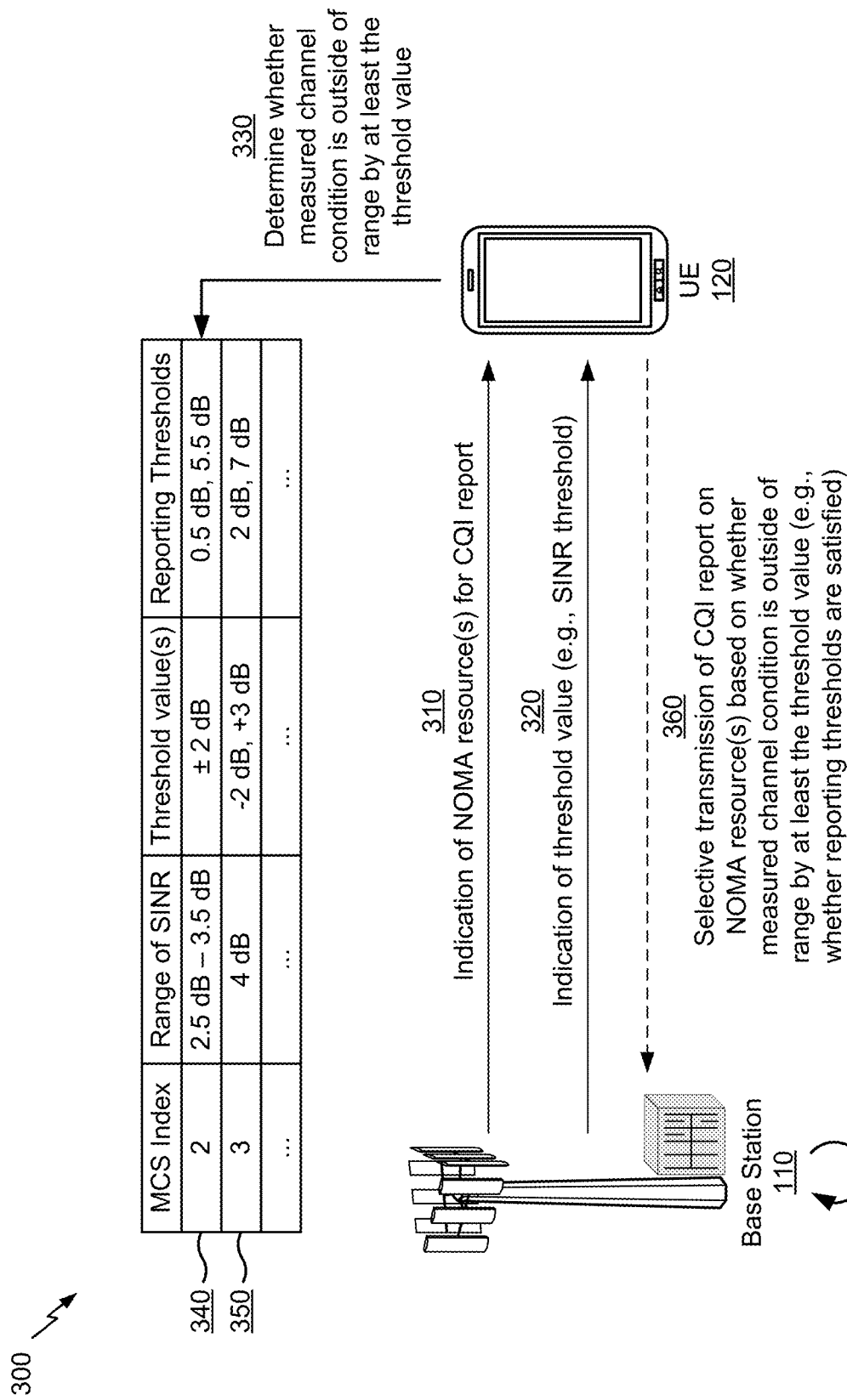
FIGS. 3 and 4 are diagrams illustrating examples of NOMA-based CQI reporting, in accordance with various aspects of the present disclosure.

FIG. 3 is a diagram illustrating an example 300 of NOMA-based CQI reporting, in accordance with various aspects of the present disclosure.

As shown by reference number 310, a base station 110 may transmit, and a UE 120 may receive, an indication of one or more non-orthogonal multiple access (NOMA) resources to be used to transmit a channel quality indicator (CQI) report. A NOMA resource may include a time resource and/or a frequency resource, and multiple UEs 120 may be assigned the same (e.g., overlapping) time and/or frequency resources. Although some techniques are described herein in connection with NOMA resources, these techniques may be applied to resources that are assigned to multiple UEs 120, which may include NOMA resources. To differentiate communications from different UEs 120 that transmit using the same resources, the different UEs 120 may transmit respective communications using one or more NOMA techniques, such as using different cover codes, transmitting using different transmit powers, and/or the like. In some aspects, each CQI report may be scrambled with a identifier of a corresponding UE 120 that transmitted the CQI report. Thus, multiple UEs 120 may transmit respective CQI reports using NOMA resources (e.g., overlapping NOMA resources), and the base station 110 may apply one or more NOMA techniques to map a CQI report to a UE 120 that transmitted the CQI report.

In some aspects, the one or more NOMA resources may be indicated in a radio resource control (RRC) message (e.g., an RRC configuration message, an RRC reconfiguration message, and/or the like). In this case, the one or more NOMA resources may be UE-specific, and may be indicated by the base station 110 to an individual UE 120 in the RRC message. This may permit flexibility in assigning NOMA resources to UEs 120, and may conserve network resources via semi-static configuration of the NOMA resources. Alternatively, the one or more NOMA resources may be indicated in system information (e.g., a system information block (SIB) and/or the like). In this case, the one or more NOMA resources may be cell-specific, and may be indicated by the base station 110 in a SIB to be read by all UEs 120 in a cell. This may conserve resources of an RRC message. Alternatively, the one or more NOMA resources may be indicated to a group of UEs 120, such as in a group-common physical downlink control channel (PDCCH). In this case, the one or more NOMA resources may be group-specific, which may permit some flexibility in assigning NOMA resources while also conserving resources of an RRC message. Alternatively, the one or more NOMA resources may be indicated in connection with a CQI request (e.g., a request by the base station 110 for a UE 120 to transmit an aperiodic CQI report, in downlink control information (DCI), and/or the like).

In some aspects, the one or more NOMA resources may be indicated as an offset from resources used for periodic CQI reporting. For example, the UE 120 may transmit periodic CQI reports with a configured time period or periodicity, and the base station 110 may indicate an offset for transmission of CQI reports on the one or more NOMA resources. The offset may indicate a number of transmission time intervals (TTIs) (e.g., subframes, slots, and/or the like) before or after configured transmission of a periodic CQI report, and the UE 120 may transmit a NOMA-based CQI report in the indicated TTI. In some aspects, the base station 110 may schedule CQI reporting using a SPS (semi-persistent scheduling) configuration and/or the like.

As shown by reference number 320, the base station 110 may transmit, and the UE 120 may receive, an indication of a threshold value associated with a range of channel conditions corresponding to a modulation and coding scheme (MCS) being used to communicate with the UE 120. In some aspects, the base station 110 may indicate (e.g., in downlink control information (DCI) and/or the like) an MCS used by the base station 110 to modulate and/or encode one or more downlink communications transmitted to the UE 120, and to be used by the UE 120 to demodulate and/or decode the downlink communication(s). For example, the base station 110 may indicate the MCS using an MCS index value. The MCS index value may correspond to a range of channel conditions, such as a range of signal-to-interference-plus-noise ratio (SINR) values, a CQI value that corresponds to the range of SINR value, and/or the like.

In some aspects, the base station 110 and/or the UE 120 may store a table that maps MCS index values to corresponding ranges of channel conditions (e.g., ranges of SINR values, CQI values, and/or the like). The base station 110 may use the table to determine an MCS to be used to communicate with a UE 120 based at least in part on a channel condition reported by the UE 120 in a CQI report. For example, the UE 120 may determine a CQI value for a channel based at least in part on a measured SINR value for the channel (e.g., using a table that maps CQI values to SINR values and/or ranges of SINR values), and may report the CQI value to the base station 110 in a CQI report. The base station 110 may use the CQI value to determine an MCS to be used to communicate with the UE 120 (e.g., using a table that maps MCS values to CQI values).

To conserve network resources, the UE 120 may be configured to only transmit a CQI report (e.g., an aperiodic CQI report) if the UE 120 measures a channel condition that is outside of the range of channel conditions, corresponding to the indicated MCS, by at least a threshold value. In some aspects, the threshold value may be a SINR threshold value, as described in more detail below.

In some aspects, the base station 110 may determine the threshold value for a UE 120 based at least in part on an estimate of a buffer delay associated with one or more packets to be transmitted to the UE 120. For example, the base station 110 may determine a smaller threshold value when the buffer delay is shorter, or may determine a larger threshold value when the buffer delay is longer. Additionally, or alternatively, the base station may determine the threshold value as a function of the buffer delay (e.g., an estimated buffer delay). In this way, the base station 110 may prioritize accurate CQI reporting for UEs 120 that are to receive a downlink communication sooner.

In some aspects, the threshold value may be indicated in an RRC message. In this case, the threshold value may be UE-specific, and may be indicated by the base station 110 to an individual UE 120 in the RRC message. This may permit flexibility in assigning different threshold values to different UEs 120, such as when different UEs 120 have different priorities and/or communicate different types of traffic (e.g., ultra-reliable low latency communications (URLLC) traffic, mission-critical traffic, enhanced mobile broadband (eMBB) traffic, best efforts traffic, and/or the like). Alternatively, the threshold value may be indicated in system information. In this case, the threshold value may be cell-specific, and may be indicated by the base station 110 in a SIB to be read by all UEs 120 in a cell. Alternatively, the threshold value may be indicated to a group of UEs 120, such as in a group-common PDCCH. In this case, the threshold value may be group-specific, which may permit some flexibility in assigning threshold values while also conserving resources of an RRC message. Alternatively, the threshold value may be indicated in DCI (e.g., in connection with a CQI request).

As shown by reference number 330, the UE 120 may determine whether a measured channel condition (e.g., a measured SINR value, a CQI value corresponding to a measured SINR value, a reference signal received power (RSRP) value, a reference signal received quality (RSRQ) value, a received signal strength indicator (RSSI) value, and/or the like) is outside of the range of channel conditions, corresponding to the indicated MCS, by at least the threshold value. For example, the UE 120 may measure a SINR value and may compare the measured SINR value to a range of SINR values corresponding to an MCS indicated to the UE 120 by the base station 110. If the measured SINR value is outside of the range of SINR values by the threshold value or more than the threshold value, then the UE 120 may transmit a CQI report, as described below.

As shown by reference number 340, as an example, an MCS index value of 2 may correspond to a range of SINR values from 2.5 dB to 3.5 dB. In some aspects, the threshold value may be indicated as a single value, and the single value may be applied to both ends of the range of SINR values to determine whether the measured SINR value is outside of the range by at least the threshold value. For example, for a range of SINR values from 2.5 dB to 3.5 dB and a single threshold value of 2 dB (e.g., shown as ±2 dB), the UE 120 may determine a range of reporting thresholds (e.g., CQI reporting thresholds) from 0.5 dB to 5.5 dB, such as by subtracting the threshold value from the lower end of the range of SINR values (e.g., 2.5 dB−2 dB=0.5 dB) and by adding the threshold value to the upper end of the range of SINR values (e.g., 3.5 dB+2 dB=5.5 dB). In this case, the UE 120 may transmit a NOMA-based CQI report if the measured SINR value is outside of the range of reporting thresholds (e.g., from 0.5 dB to 5.5 dB), and may avoid transmission of a CQI report if the measured SINR value is within the range of reporting thresholds.

As shown by reference number 350, as another example, an MCS index value of 3 may correspond to a SINR value of 4 dB. As used herein, the range of SINR values may include a range from a lower value to an upper value. In some aspects, the lower value and the upper value may be different (e.g., 2.5 dB and 3.5 dB, as described above). In some aspects, the lower value and the upper value may be the same (e.g., 4 dB). In some aspects, the threshold value may be indicated as multiple values (e.g., a positive threshold value and a negative threshold value), and different values may be applied to different ends of the range of SINR values to determine whether the measured SINR value is outside of the range by at least the threshold value. For example, for SINR value of 4 dB and threshold values of 2 dB and 3 dB (e.g., shown as −2 dB and +3 dB), the UE 120 may determine a range of reporting thresholds from 2 dB to 7 dB, such as by subtracting a negative threshold value (e.g., a lower threshold value) from the lower end of the range of SINR values (e.g., 4 dB−2 dB=2 dB) and by adding a positive threshold value (e.g., an upper threshold value) to the upper end of the range of SINR values (e.g., 4 dB+3 dB=7 dB). In this case, the UE 120 may transmit a CQI report if the measured SINR value is outside of the range of reporting thresholds (e.g., from 2 dB to 7 dB), and may prevent transmission of a CQI report if the measured SINR value is within the range of reporting thresholds.

As shown by reference number 360, the UE 120 may selectively transmit the CQI report on the one or more NOMA resources based at least in part on whether the measured channel condition is outside of the range of channel conditions by at least the threshold value. For example, the UE 120 may transmit the CQI report if the measured channel condition is outside of the range of channel conditions by the threshold value or by more than the threshold value, and may not transmit the CQI report if the measured channel condition is within the range of channel conditions. In other words, the UE 120 may transmit the CQI report if the measured channel condition satisfies the reporting thresholds, and may not transmit the CQI report if the measured channel condition does not satisfy the reporting thresholds.

In some aspects, satisfying the reporting thresholds may mean that the measured channel condition is within the range of reporting thresholds (e.g., not including the ends of the range), and failing to satisfy the reporting thresholds may mean that the measured channel condition is equal to either end or outside of either end of the range of reporting thresholds. Alternatively, satisfying the reporting thresholds may mean that the measured channel condition is within the range of the reporting thresholds or equal to either end of the range of reporting thresholds, and failing to satisfy the reporting thresholds may mean that the measured channel condition is outside of either end of the range of reporting thresholds.

In some aspects, the CQI report may be an aperiodic CQI report. For example, the UE 120 may transmit periodic CQI reports according to a schedule (e.g., with a certain periodicity), and may selectively transmit the aperiodic CQI report based at least in part on a request from the base station 110 for the aperiodic CQI report. For example, after receiving the request, the UE 120 may determine whether a measured channel condition is within a range of reporting thresholds, and may selectively transmit the aperiodic CQI report on the one or more NOMA resources based at least in part on the comparison, as described above. In some aspects, the request for the aperiodic CQI report may be transmitted by the base station 110 and received by the UE 120 on a group-common PDCCH associated with the UE 120 and one or more other UEs 120.

Additionally, or alternatively, the CQI report may be pre-scheduled based at least in part on a traffic profile associated with the UE 120. For example, if the UE 120 has a predictable traffic profile, such as the predictable downlink traffic (e.g., in a factory automation scenario and/or the like), then the CQI report may be scheduled to be triggered a threshold time period before transmission of the downlink traffic and/or within a threshold time period of the start of the downlink traffic. In this way, channel conditions may be determined when such conditions are most relevant (e.g., prior to transmission of traffic).

In some aspects, if the UE 120 transmits the CQI report on the NOMA resources, then the UE 120 may scramble the CQI report using a UE identifier associated with the UE 120. In this way, CQI reports from different UEs 120 may be scrambled using different UE identifiers, thereby permitting the base station 110 to determine which UE 120 transmitted which CQI report when multiple CQI reports are received by the base station 110 on the same NOMA resources. Additionally, or alternatively, another NOMA technique may be used, such as using different cover codes, using different transmit powers, and/or the like.

As shown by reference number 370, the base station 110 may monitor the one or more NOMA resources for one or more CQI reports (e.g., transmitted by the UE 120 and/or one or more other UEs 120). In some aspects, the base station 110 may not receive any CQI reports on the NOMA resources, such as when channel conditions have not changed significantly. For example, if channel conditions measured by all UEs 120, from which an aperiodic CQI report is requested, are within the reporting thresholds, then none of the UEs 120 may transmit a CQI report, and the base station 110 may not receive any CQI reports on the NOMA resources.

In some aspects, the base station 110 may receive one or more CQI reports on the one or more NOMA resources. In this case, the base station 110 may descramble each received CQI report using a UE identifier, and may determine that a CQI report is for a particular UE 120 when the UE identifier of that particular UE 120 results in valid descrambling. In this way, a single set of NOMA resources can be used for transmission of CQI reports for multiple UEs 120, which conserves network resources while permitting the base station 110 to map CQI reports to corresponding UEs 120 and perform link adaptation for those UEs 120 accordingly.

As indicated above, FIG. 3 is provided as an example. Other examples are possible and may differ from what was described with respect to FIG. 3.

Figure 4:
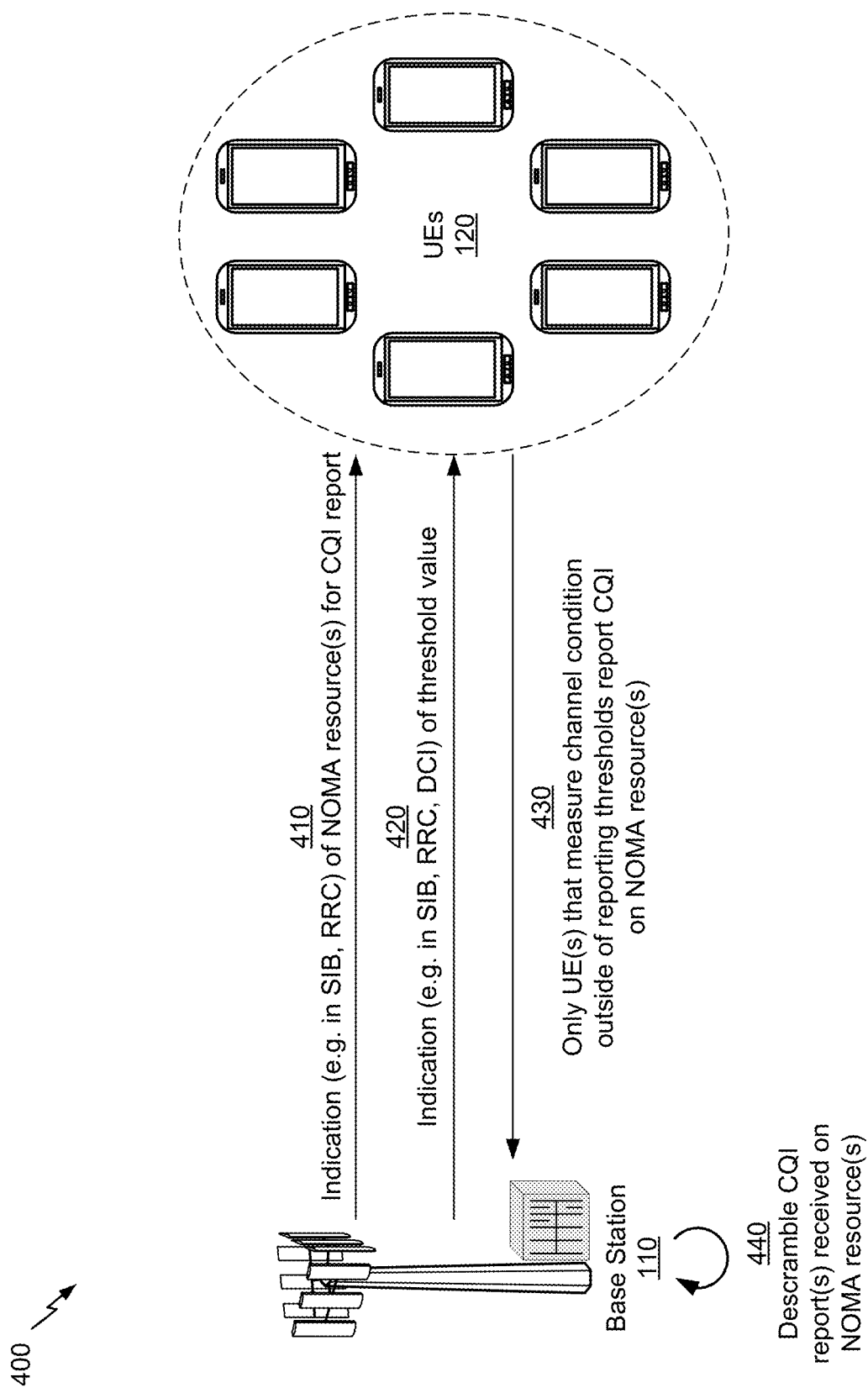

FIG. 4 is a diagram illustrating another example 400 of NOMA-based CQI reporting, in accordance with various aspects of the present disclosure.

As shown by reference number 410, a base station 110 may transmit, and a set of (e.g., one or more) UEs 120 may receive, an indication of one or more NOMA resources to be used to transmit one or more CQI reports corresponding to the set of UEs 120, in a similar manner as described above in connection with FIG. 3. The one or more NOMA resources may be UE-specific (e.g., indicated in an RRC message, in DCI, and/or the like), may be group-specific (e.g., indicated in a group-common PDCCH), or may be cell-specific (e.g., indicated in system information or a group-common PDCCH common to all UEs 120 in a cell). In some aspects, the same set of NOMA resources may be used for all UEs 120 in a cell, or for a group of UEs 120 (e.g., a subset of UEs 120 in the cell). In some aspects, different NOMA resources may be used for different UEs 120 and/or different groups of UEs 120. In some aspects, the one or more NOMA resources may be indicated as an offset from resources utilized by the UE 120 for periodic CQI reporting, which may result in different sets of NOMA resources being used for different UEs 120 that report periodic CQI on different periodic resources.

As shown by reference number 420, the base station 110 may transmit, and the set of UEs 120 may receive, an indication of a threshold value, in a similar manner as described above in connection with FIG. 3. The threshold value may be UE-specific (e.g., indicated in an RRC message, in DCI, and/or the like), may be group-specific (e.g., indicated in a group-common PDCCH), or may be cell-specific (e.g., indicated in system information or a group-common PDCCH common to all UEs 120 in a cell). In some aspects, the same threshold value may be used for all UEs 120 in a cell, or for a group of UEs 120 (e.g., a subset of UEs 120 in the cell). In some aspects, the same threshold value may correspond to different reporting thresholds for different UEs 120, such as when the different UEs 120 are associated with different MCS index values. In some aspects, different threshold values may be used for different UEs 120 and/or different groups of UEs 120.

As shown by reference number 430, a UE 120 (e.g., each UE 120) in the set of UEs 120 may selectively transmit a CQI report on the one or more NOMA resources based at least in part on whether a channel condition, measured by the UE 120, is outside of the range of channel conditions by at least the threshold value, in a similar manner as described above in connection with FIG. 3. In some aspects, none of the UEs 120 in the set of UEs 120 may transmit a CQI report. In some aspects, a subset of the UEs 120 in the set of UEs 120 may transmit a CQI report. In some aspects, all of the UEs 120 in the set of UEs 120 may transmit a CQI report.

As shown by reference number 440, the base station 110 may monitor the one or more NOMA resources for one or more CQI reports, transmitted by one or more UEs 120 in the set of UEs 120, and may descramble each received CQI report using a UE identifier, as described above in connection with FIG. 3. For example, the base station 110 may attempt to descramble a CQI report using UE identifiers associated with UEs 120 in the set of UEs 120, and may map the CQI reports to a corresponding UE 120 for which descrambling is successful. In this way, fewer resources may be used for transmission of CQI reports for multiple UEs 120, which conserves network resources.

As indicated above, FIG. 4 is provided as an example. Other examples are possible and may differ from what was described with respect to FIG. 4.

Figure 5:
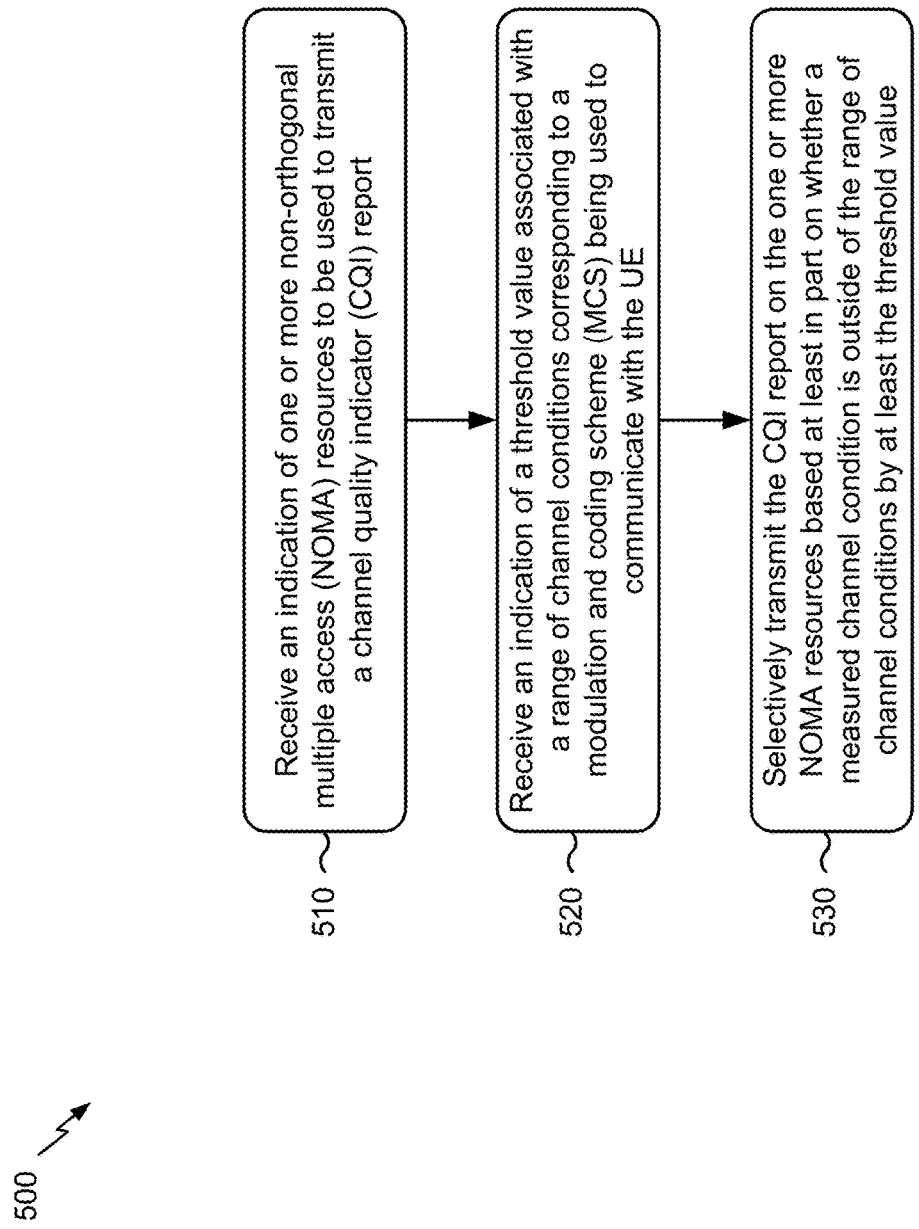

FIG. 5 is a diagram illustrating an example process 500 performed, for example, by a UE, in accordance with various aspects of the present disclosure. Example process 500 is an example where a UE (e.g., UE 120 and/or the like) performs operations associated with NOMA-based CQI reporting. Although some techniques are described below in connection with NOMA resources, these techniques may be applied to resources that are assigned to multiple UEs, which may include NOMA resources.

As shown in FIG. 5, in some aspects, process 500 may include receiving an indication of one or more non-orthogonal multiple access (NOMA) resources to be used to transmit a channel quality indicator (CQI) report (block 510). For example, the UE (e.g., using antenna 252, DEMOD 254, MIMO detector 256, receive processor 258, controller/processor 280, and/or the like) may receive an indication of one or more NOMA resources to be used to transmit a CQI report, as described above in connection with FIGS. 3-4.

As further shown in FIG. 5, in some aspects, process 500 may include receiving an indication of a threshold value associated with a range of channel conditions corresponding to a modulation and coding scheme (MCS) being used to communicate with the UE (block 520). For example, the UE (e.g., using antenna 252, DEMOD 254, MIMO detector 256, receive processor 258, controller/processor 280, and/or the like) may receive an indication of a threshold value associated with a range of channel conditions corresponding to an MCS being used to communicate with the UE, as described above in connection with FIGS. 3-4.

As further shown in FIG. 5, in some aspects, process 500 may include selectively transmitting the CQI report on the one or more NOMA resources based at least in part on whether a measured channel condition is outside of the range of channel conditions by at least the threshold value (block 530). For example, the UE (e.g., using controller/processor 280, transmit processor 264, TX MIMO processor 266, MOD 254, antenna 252, and/or the like) may selectively transmit the CQI report on the one or more NOMA resources based at least in part on whether a measured channel condition is outside of the range of channel conditions by at least the threshold value, as described above in connection with FIGS. 3-4.

Process 500 may include additional aspects, such as any single aspect or any combination of aspects described below and/or in connection with one or more other processes described elsewhere herein.

In some aspects, the range of channel conditions is a range of signal-to-interference-plus-noise ratio (SINR) values corresponding to the MCS, and wherein the measured channel condition is a measured SINR value. In some aspects, the CQI report is an aperiodic CQI report. In some aspects, the aperiodic CQI report is triggered based at least in part on a request received on a group-common physical downlink control channel (PDCCH). In some aspects, the CQI report is pre-scheduled based at least in part on a traffic profile associated with the UE.

In some aspects, the CQI report is transmitted on the one or more NOMA resources when the measured channel condition is outside of the range of channel conditions by at least the threshold value. In some aspects, the CQI report is scrambled with a UE identifier associated with the UE. In some aspects, the CQI report is not transmitted on the one or more NOMA resources when the measured channel condition is within the range of channel conditions or is outside of the range of channel conditions by less than the threshold value.

In some aspects, the MCS is indicated to the UE and the range of channel conditions corresponding to the MCS is determined based at least in part on a table that maps MCS index values to at least one of channel condition values or ranges of channel condition values. In some aspects, at least one of the threshold value or the one or more NOMA resources is indicated in a radio resource control (RRC) message. In some aspects, the threshold value is indicated in downlink control information (DCI). In some aspects, at least one of the threshold value or the one or more NOMA resources is indicated in system information.

In some aspects, the threshold value is UE-specific. In some aspects, at least one of the threshold value or the one or more NOMA resources is group-specific. In some aspects, at least one of the threshold value or the one or more NOMA resources is cell-specific. In some aspects, the threshold value indicates at least one of: a positive threshold value corresponding to a better channel condition than the range of channel conditions corresponding to the MCS, a negative threshold value corresponding to a worse channel condition than the range of channel conditions corresponding to the MCS, or some combination thereof. In some aspects, the one or more NOMA resources are indicated as an offset from resources utilized for a periodic CQI report.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a base station, in accordance with various aspects of the present disclosure. Example process 600 is an example where a base station (e.g., base station 110 and/or the like) performs operations associated with NOMA-based CQI reporting. Although some techniques are described below in connection with NOMA resources, these techniques may be applied to resources that are assigned to multiple UEs, which may include NOMA resources.

As shown in FIG. 6, in some aspects, process 600 may transmitting, to a user equipment (UE), an indication of one or more non-orthogonal multiple access (NOMA) resources to be used for a channel quality indicator (CQI) report associated with the UE (block 610). For example, the base station (e.g., using controller/processor 240, transmit processor 220, TX MIMO processor 230, MOD 232, antenna 234, and/or the like) may transmit, to a UE, an indication of one or more NOMA resources to be used for a CQI report associated with the UE, as described above in connection with FIGS. 3-4.

As further shown in FIG. 6, in some aspects, process 600 may include transmitting, to the UE, an indication of a threshold value associated with a range of channel conditions corresponding to a modulation and coding scheme (MCS) used to communicate with the UE (block 620). For example, the base station (e.g., using controller/processor 240, transmit processor 220, TX MIMO processor 230, MOD 232, antenna 234, and/or the like) may transmit, to the UE, an indication of a threshold value associated with a range of channel conditions corresponding to an MCS used to communicate with the UE, as described above in connection with FIGS. 3-4.

As further shown in FIG. 6, in some aspects, process 600 may include monitoring the one or more NOMA resources for the CQI report (block 630). For example, the base station (e.g., using antenna 234, DEMOD 232, MIMO detector 236, receive processor 238, controller/processor 240, and/or the like) may monitor the one or more NOMA resources for the CQI report, as described above in connection with FIGS. 3-4.

Process 600 may include additional aspects, such as any single aspect or any combination of aspects described below and/or in connection with one or more other processes described elsewhere herein.

In some aspects, the threshold value is determined for the UE based at least in part on an estimate of a buffer delay associated with one or more packets to be transmitted to the UE. In some aspects, the threshold value is a smaller value when the buffer delay is shorter, or wherein the threshold value is a larger value when the buffer delay is longer.

In some aspects, the range of channel conditions is a range of signal-to-interference-plus-noise ratio (SINR) values corresponding to the MCS. In some aspects, the CQI report is an aperiodic CQI report. In some aspects, the aperiodic CQI report is triggered based at least in part on a request transmitted on a group-common physical downlink control channel (PDCCH) associated with the UE. In some aspects, the CQI report is pre-scheduled based at least in part on a traffic profile associated with the UE.

In some aspects, the CQI report is received on the one or more NOMA resources and descrambled using a UE identifier associated with the UE. In some aspects, the MCS is indicated to the UE in downlink control information (DCI). In some aspects, at least one of the threshold value or the one or more NOMA resources is indicated to the UE in a radio resource control (RRC) message. In some aspects, the threshold value is indicated in downlink control information (DCI). In some aspects, the threshold value is indicated in system information.

In some aspects, the threshold value is UE-specific. In some aspects, at least one of the threshold value or the one or more NOMA resources is group-specific. In some aspects, at least one of the threshold value or the one or more NOMA resources is cell-specific. In some aspects, the threshold value indicates at least one of: a positive threshold value corresponding to a better channel condition than the range of channel conditions corresponding to the MCS, a negative threshold value corresponding to a worse channel condition than the range of channel conditions corresponding to the MCS, or some combination thereof. In some aspects, the one or more NOMA resources are indicated as an offset from resources utilized for a periodic CQI report.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of a list of" items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a base station, an indication of one or more resources, assigned to multiple UEs, to be used to transmit a channel quality indicator (CQI) report;
   receiving, from the base station, an indication of a threshold value,
      wherein the indication of the threshold value is a modulation and coding scheme (MCS) index value associated with a MCS being used to communicate with the UE, and
      wherein the MCS index value corresponds to a range of channel conditions and the threshold value; and
   selectively transmitting the CQI report on the one or more resources based at least in part on whether a measured channel condition is outside of the range of channel conditions by at least the threshold value.

2. The method of claim 1, wherein the range of channel conditions is a range of signal-to-interference-plus-noise ratio (SINR) values corresponding to the MCS, and wherein the measured channel condition is a measured SINR value.

3. The method of claim 1, wherein the CQI report is an aperiodic CQI report.

4. The method of claim 3, wherein the aperiodic CQI report is triggered based at least in part on a request received on a group-common physical downlink control channel (PDCCH).

5. The method of claim 1, wherein the CQI report is pre-scheduled based at least in part on a traffic profile associated with the UE.

6. The method of claim 1, wherein the CQI report is transmitted on the one or more resources when the measured channel condition is outside of the range of channel conditions by at least the threshold value.

7. The method of claim 1, wherein the CQI report is scrambled with a UE identifier associated with the UE.

8. The method of claim 1, wherein the CQI report is not transmitted on the one or more resources when the measured channel condition is within the range of channel conditions or is outside of the range of channel conditions by less than the threshold value.

9. The method of claim 1, wherein the MCS is indicated to the UE and the range of channel conditions corresponding to the MCS is determined based at least in part on a table that maps MCS index values to at least one of channel condition values or ranges of channel condition values.

10. The method of claim 1, wherein the threshold value is indicated in at least one of a radio resource control (RRC) message, downlink control information (DCI), or system information; and
    wherein the one or more resources are indicated in at least one of the RRC message or the system information.

11. The method of claim 1, wherein the threshold value is UE-specific, group-specific, or cell-specific; and
    wherein the one or more resources are group-specific or cell-specific.

12. The method of claim 1, wherein the threshold value indicates at least one of:
    a positive threshold value corresponding to a better channel condition than the range of channel conditions corresponding to the MCS,
    a negative threshold value corresponding to a worse channel condition than the range of channel conditions corresponding to the MCS, or
    some combination thereof.

13. The method of claim 1, wherein the one or more resources are indicated as an offset from resources utilized for a periodic CQI report.

14. The method of claim 1, wherein the one or more resources are one or more non-orthogonal multiple access (NOMA) resources.

15. A method of wireless communication performed by a base station, comprising:
- transmitting, to a user equipment (UE), an indication of one or more resources, assigned to multiple UEs, to be used for a channel quality indicator (CQI) report associated with the UE;
- determining a threshold value, associated with a range of channel conditions corresponding to a modulation and coding scheme (MCS) used to communicate with the UE, for the UE based at least in part on an estimate of a buffer delay associated with one or more packets to be transmitted to the UE;
- transmitting, to the UE, an indication of the threshold value; and
- monitoring the one or more resources for the CQI report.

16. The method of claim 15, wherein the threshold value is a smaller value when the buffer delay is shorter, or wherein the threshold value is a larger value when the buffer delay is longer.

17. The method of claim 15, wherein the range of channel conditions is a range of signal-to-interference-plus-noise ratio (SINR) values corresponding to the MCS.

18. The method of claim 15, wherein the CQI report is an aperiodic CQI report.

19. The method of claim 18, wherein the aperiodic CQI report is triggered based at least in part on a request transmitted on a group-common physical downlink control channel (PDCCH) associated with the UE.

20. The method of claim 15, wherein the CQI report is pre-scheduled based at least in part on a traffic profile associated with the UE.

21. The method of claim 15, wherein the CQI report is received on the one or more resources and descrambled using a UE identifier associated with the UE.

22. The method of claim 15, wherein the MCS is indicated to the UE in downlink control information (DCI).

23. The method of claim 15, wherein the threshold value is indicated in at least one of a radio resource control (RRC) message, downlink control information (DCI), or system information; and
- wherein the one or more resources are indicated in at least one of the RRC message or the system information.

24. The method of claim 15, wherein the threshold value is UE-specific, group-specific, or cell-specific; and
- wherein the one or more resources are group-specific or cell-specific.

25. The method of claim 15, wherein the threshold value indicates at least one of:
- a positive threshold value corresponding to a better channel condition than the range of channel conditions corresponding to the MCS,
- a negative threshold value corresponding to a worse channel condition than the range of channel conditions corresponding to the MCS, or
- some combination thereof.

26. The method of claim 15, wherein the one or more resources are indicated as an offset from resources utilized for a periodic CQI report.

27. The method of claim 15, wherein the one or more resources are one or more non-orthogonal multiple access (NOMA) resources.

28. A user equipment (UE) for wireless communication, comprising:
- memory; and
- one or more processors coupled to the memory, the memory and the one or more processors configured to:
  - receive, from a base station, an indication of one or more resources, assigned to multiple UEs, to be used to transmit a channel quality indicator (CQI) report;
  - receive, from the base station, an indication of a threshold value,
    - wherein the indication of the threshold value is a modulation and coding scheme (MCS) index value associated with a MCS being used to communicate with the UE, and
    - wherein the MCS index value corresponds to a range of channel conditions and the threshold value; and
  - selectively transmit the CQI report on the one or more resources based at least in part on whether a measured channel condition is outside of the range of channel conditions by at least the threshold value.

29. A base station for wireless communication, comprising:
- memory; and
- one or more processors coupled to the memory, the memory and the one or more processors configured to:
  - transmit, to a user equipment (UE), an indication of one or more resources, assigned to multiple UEs, to be used for a channel quality indicator (CQI) report associated with the UE;
  - determine a threshold value, associated with a range of channel conditions corresponding to a modulation and coding scheme (MCS) used to communicate with the UE, for the UE based at least in part on an estimate of a buffer delay associated with one or more packets to be transmitted to the UE;
  - transmit, to the UE, an indication of the threshold value; and
  - monitor the one or more resources for the CQI report.

30. The base station of claim 29, wherein the CQI report is at least one of:
- an aperiodic CQI report triggered based at least in part on a request transmitted on a group-common physical downlink control channel (PDCCH) associated with the UE,
- pre-scheduled based at least in part on a traffic profile associated with the UE, or
- received on the one or more resources and descrambled using a UE identifier associated with the UE.

* * * * *